US011625840B2

(12) United States Patent
Hong et al.

(10) Patent No.: US 11,625,840 B2
(45) Date of Patent: *Apr. 11, 2023

(54) DETECTING MOTION IN IMAGES

(71) Applicant: Google LLC, Mountain View, CA (US)

(72) Inventors: Wei Hong, Sunnyvale, CA (US);
Marius Renn, San Jose, CA (US);
Rodrigo Carceroni, Mountain View, CA (US)

(73) Assignee: Google LLC, Mountain View, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/185,054

(22) Filed: Feb. 25, 2021

(65) Prior Publication Data
US 2021/0183077 A1 Jun. 17, 2021

Related U.S. Application Data

(63) Continuation of application No. 16/005,172, filed on Jun. 11, 2018, now Pat. No. 10,957,054, which is a
(Continued)

(51) Int. Cl.
*G06T 7/269* (2017.01)
*G06T 7/254* (2017.01)
(Continued)

(52) U.S. Cl.
CPC .............. *G06T 7/269* (2017.01); *G06T 7/248* (2017.01); *G06T 7/254* (2017.01); *G06T 7/262* (2017.01);
(Continued)

(58) Field of Classification Search
None
See application file for complete search history.

(56) References Cited

U.S. PATENT DOCUMENTS

| 4,637,571 A | 1/1987 | Holder et al. |
| 5,053,876 A | 10/1991 | Blissett et al. |

(Continued)

FOREIGN PATENT DOCUMENTS

| CN | 1301358 A | 6/2001 |
| CN | 1411281 A | 4/2003 |

(Continued)

OTHER PUBLICATIONS

"Background subtraction," From Wikipedia, the free encyclopedia, last modified on Jan. 2, 2016 [retrieved on Jan. 28, 2016]. Retrieved from the Internet: URL<https://en.wikipedia.org/wiki/Background_subtraction>, 9 pages.

(Continued)

*Primary Examiner* — Pinalben Patel
(74) *Attorney, Agent, or Firm* — Fish & Richardson P.C.

(57) ABSTRACT

In general, the subject matter described in this disclosure can be embodied in methods, systems, and program products for detecting motion in images. A computing system receives first and second images that were captured by a camera. The computing system generates, using the images, a mathematical transformation that indicates movement of the camera from the first image to the second image. The computing system generates, using the first image and the mathematical transformation, a modified version of the first image that presents the scene that was captured by the first image from a position of the camera when the second image was captured. The computing system determines a portion of the first image or second image at which a position of an object in the scene moved, by comparing the modified version of the first image to the second image.

16 Claims, 5 Drawing Sheets

Related U.S. Application Data continuation of application No. 15/010,239, filed on Jan. 29, 2016, now Pat. No. 10,002,435.

(51) Int. Cl.

| | | |
|---|---|---|
| *G06T 7/262* | (2017.01) | |
| *G06T 7/73* | (2017.01) | |
| *G06T 7/33* | (2017.01) | |
| *G06T 7/246* | (2017.01) | |

(52) U.S. Cl.
CPC .............. *G06T 7/337* (2017.01); *G06T 7/74* (2017.01); *G06T 2207/10016* (2013.01); *G06T 2207/20021* (2013.01); *G06T 2207/20048* (2013.01); *G06T 2207/30241* (2013.01); *G06T 2207/30244* (2013.01)

(56) References Cited

U.S. PATENT DOCUMENTS

| | | | |
|---|---|---|---|
| 6,252,714 | B1 | 6/2001 | Guenther et al. |
| RE38,420 | E | 2/2004 | Thomas |
| 6,961,481 | B2 | 11/2005 | Lee et al. |
| 7,313,254 | B2 | 12/2007 | Lee et al. |
| 7,409,092 | B2 | 8/2008 | Srinivasa |
| 7,697,725 | B2 | 4/2010 | Burns et al. |
| 8,401,308 | B2 | 3/2013 | Nakamura et al. |
| 8,436,893 | B2 | 5/2013 | McNamer et al. |
| 8,977,007 | B1 | 3/2015 | Ferguson et al. |
| 10,002,435 | B2* | 6/2018 | Hong .............. G06T 7/74 |
| 11,308,657 | B1* | 4/2022 | Berlin ............. G06N 3/04 |
| 2003/0038927 | A1 | 2/2003 | Alden |
| 2005/0053876 | A1 | 3/2005 | Joos et al. |
| 2005/0243351 | A1 | 11/2005 | Aoyama |
| 2005/0244077 | A1* | 11/2005 | Kitamura .......... G06T 7/13 382/261 |
| 2005/0271300 | A1 | 12/2005 | Pina |
| 2007/0230742 | A1* | 10/2007 | Burns .............. G06T 7/207 382/103 |
| 2008/0037827 | A1 | 2/2008 | Corcoran et al. |
| 2008/0037839 | A1 | 2/2008 | Corcoran et al. |
| 2008/0044170 | A1 | 2/2008 | Yap et al. |
| 2013/0010073 | A1 | 1/2013 | Do et al. |
| 2013/0121597 | A1 | 5/2013 | Hsu |
| 2013/0271578 | A1 | 10/2013 | Richards |
| 2013/0336583 | A1 | 12/2013 | Ernst |
| 2014/0267915 | A1* | 9/2014 | Bailey ............. H04N 5/14 348/575 |
| 2015/0117707 | A1 | 4/2015 | Carceroni et al. |
| 2015/0146994 | A1 | 5/2015 | Amison et al. |
| 2015/0256755 | A1* | 9/2015 | Wu ................. G06T 7/277 348/208.6 |
| 2015/0310626 | A1 | 10/2015 | Yamamoto et al. |
| 2015/0363635 | A1 | 12/2015 | Suri |
| 2016/0277650 | A1 | 9/2016 | Nagaraja et al. |
| 2018/0350086 | A1* | 12/2018 | Sweet, III ........ G06T 7/593 |

FOREIGN PATENT DOCUMENTS

| | | |
|---|---|---|
| CN | 101198031 A | 6/2008 |
| CN | 102156624 A | 8/2011 |
| CN | 103297682 A | 9/2013 |
| CN | 103973963 A | 8/2014 |
| CN | 104063867 A | 9/2014 |
| CN | 104871180 A | 8/2015 |
| CN | 105025188 A | 11/2015 |
| GB | 2378338 | 2/2003 |
| GB | 2380348 | 4/2003 |
| JP | 2004-289785 A | 10/2004 |
| JP | 2005-051777 | 2/2005 |
| JP | 2005-136596 | 5/2005 |
| JP | 2008-518331 | 5/2008 |
| JP | 2015-070328 A | 4/2015 |
| JP | 2000-082145 A | 12/2020 |
| WO | WO 2002-057758 | 7/2002 |

OTHER PUBLICATIONS

"Homography (computer vision)," From Wikipedia, the free encyclopedia, last modified on Sep. 17, 2015 [retrieved on Oct. 13, 2015]. Retrieved from the Internet: URL<https://en.wikipedia.org/wiki/Homography_(computer_vision)>, 3 pages.

"Image stabilization," From Wikipedia, the free encyclopedia, last modified on Sep. 28, 2015 [retrieved on Oct. 13, 2015]. Retrieved from the Internet: URL<https://en.wikipedia.org/wiki/Image_stabilization#Optical_image_stabilization>, 4 pages.

"Infinite impulse response," From Wikipedia, the free encyclopedia, last modified on Sep. 7, 2015 [retrieved on Oct. 13, 2015]. Retrieved from the Internet: URL<https://en.wikipedia.org/wiki/Infinite_impulse_response>, 4 pages.

"Lucas-Kanade method," From Wikipedia, the free encyclopedia, last modified on Sep. 15, 2015 [retrieved on Jan. 28, 2016]. Retrieved from the Internet: URL<https://en.wikipedia.org/wiki/Lucas%E2%80%93Kanade_method> 3 pages.

Baker et al., "Removing Rolling Shutter Wobble," Proceedings of the IEEE Conference on Computer Vision and Pattern Recognition, Jun. 2010, pp. 2392-2399.

CN Office Action in Chinese Appln. No. 201680061608.2, dated Apr. 1, 2021, 19 pages (with English translation).

Crawford et al., "Gradient Based Dominant Motion Estimation with Integral Projections for Real Time Video Stabilisation," 2004 International Conference on Image Processing (ICIP), vol. 5, pp. 3371-3374, Oct. 2004.

Fisher, "Gaussian Smoothing," 2003 [retrieved on Jan. 28, 2016]. Retrieved from the Internet: URL<http://homepages.inf.ed.ac.uk/rbf/HIPR2/gsmooth.htm>, 9 pages.

Grundmann et al., "Video Stabilization on YouTube," Google Research Blog, May 4, 2012 [retrieved on Oct. 13, 2015]. Retrieved from the Internet: URL<http://googleresearch.blogspot.de/2012/05/video-stabilization-on-youtube.html>, 7 pages.

Hartley and Zisserman, "Multiple View Geometry in Computer Vision, Second Edition," Cambridge University Press, 2003, pp. 91-130 only.

Indian Office Action in Appln. No. 201847014369, dated Dec. 14, 2020, 7 pages.

International Search Report and Written Opinion in International Application No. PCT/US2016/064193, dated May 17, 2017, 20 pages.

Invitation to Pay Additional Fees and, Where Applicable, Protest Fee, with Partial International Search in International Application No. PCT/US2016/064193, dated Mar. 17, 2017, 10 pages.

JP Office Action in Japanese Application No. 2018-520548 dated Oct. 8, 2019, 10 pages (with English translation).

JP Office Action in Japanese Application No. 2018-520548, dated Jun. 22, 2020, 12 pages (with English translation).

Jung et al. "Real-time Motion Tracking from a Mobile Robot," Jan. 1, 2005, [retrieved on Feb. 8, 2017] Retrieved from Internet URL<http://www.dtic.mil/get-tr-doc/pdf?location=U2&doc=GetTRDoc/pdf&AD=ADA459071> 19 pages.

Koppel et al., Robust and Real-Time Image Stabilization and Rectification, Application of Computer Vision, 2005. WACV/MOTIONS '05 vol. 1. Seventh IEEE Workshops on, Jan. 2005, pp. 350-355.

Lavry, "Understanding IIR (Infinite Impulse Response) Filters—An Intuitive Approach," Lavry Engineering, 1997, 5 pages.

Liu and Jin, "Content-Preserving Warps for 3D Video Stabilization," ACM Transactions on Graphics (TOG)—Proceedings of ACM SIGGRAPH 2009, vol. 28, Issue 3, Article No. 44, Aug. 2009, pp. 1-9.

Rawat and Singhai, "Review of Motion Estimation and Video Stabilization techniques For hand held mobile video," Signal & Image Processing: An International Journal (SIPIJ) 2(2): 159-168, Jun. 2011.

Roth, "Homography," ECCD, COMP 4900, Class Note, Fall 2009, 22 pages.

Tian and Narasimhan, "Globally Optimal Estimation of Nonrigid Image Distortion," International journal of computer vision, 98(3):279-302, Jul. 2012.

(56) References Cited

OTHER PUBLICATIONS

Unknown Author, "The Homography transformation," CorrMap, 2013 [retrieved on Oct. 13, 2015]. Retrieved from the Internet: URL<http://www.corrmap.com/features/homography_transformation.php>, 5 pages.

Wilkie, "Motion stabilisation for video sequences," Imperial College London, Department of Computing, Final Year Project, Jun. 18, 2003, 63 pages.

Wonjun et al. "Spatiotemporal Saliency Detection Using Textural Contrast and Its Applications," IEEE Transactions on Circuits and Systems for Video Technology, IEEE Service Center, Piscataway, NJ, 24(4), Apr. 1, 2014, 14 pages.

CN Office Action in Chinese Application No. 201680061608.2, dated Dec. 23, 2021, 7 pages (with English translation).

Badnerkar et al., "Motion sensed video storage algorithm for surveillance recording," 12th International Conference on Hybrid Intelligent Systems, Pune, India, Dec. 4-7, 2012, Dec. 2012, pp. 431-434.

EP Office Action in European Appln. No. 16822775.9, dated Apr. 28, 2021, 15 pages.

Vavilin et al., "Camera motion estimation and moving object detection based on local feature tracking," International Conference on Industrial, Engineering and Other Applications of Applied Intelligent Systems 2012, Dalian, China, Jun. 9-12, 2012, Jun. 2012, pp. 544-552.

\* cited by examiner

DETECTING MOTION IN IMAGES

CROSS-REFERENCE TO RELATED APPLICATIONS

This application is a continuation of and claims priority to U.S. application Ser. No. 16/005,172, filed on Jun. 11, 2018, which is a continuation of and claims priority to U.S. application Ser. No. 15/010,239, filed on Jan. 29, 2016, the entire contents of each are hereby incorporated by reference.

TECHNICAL FIELD

This document generally relates to detecting motion in images.

BACKGROUND

It is more and more common for people to carry mobile computing devices that include built-in cameras, such as smartphones or tablet computing devices. As the processing speed and storage capacities of these devices increase, people may more commonly use the devices to capture videos or various series of pictures (e.g., captured by holding down the shutter button to capture many pictures over a short period of time). These videos and series of pictures can capture a scene, in which objects or humans move through the scene from image to image.

SUMMARY

This document describes techniques, methods, systems, and other mechanisms for detecting motion in images. The motion-detection mechanism may compare a recently-received image to one that was previously-received to identify which objects moved in the scene that is shown by the images. Because the camera may have been moving, which would cause stationary objects in the background to appear at different locations in each of the images, the motion-detection mechanism may analyze the images to identify how the camera moved. It may then use this analysis to modify the previously-received image to show its content from an estimated orientation of the camera when the recently-received image was captured. In this way, the background may appear to remain substantially the same and stationary between the modified previously-received image and the currently-received image. This enables the system to analyze the two images to identify objects that are moving independent of the background.

As additional description to the embodiments described below, the present disclosure describes the following embodiments.

Embodiment 1 is a computer-implemented method for detecting motion in images. The method includes receiving, by a computing system, a first image that was captured by a camera. The method includes receiving, by the computing system, a second image that was captured by the camera. The method includes generating, by the computing system and using the first image and the second image, a mathematical transformation that indicates movement of the camera from the first image to the second image with respect to a scene that is reflected in the first image and the second image. The method includes generating, by the computing system and using the first image and the mathematical transformation, a modified version of the first image that presents the scene that was captured by the first image from a position of the camera when the second image was captured, wherein a position of the camera when the first image was captured is different from the position of the camera when the second image was captured. The method includes determining, by the computing system, a portion of the first image or second image at which a position of an object in the scene moved, by comparing the modified version of the first image to the second image.

Embodiment 2 is the computer-implemented method of embodiment 1, wherein the second image is an image that the camera captured in a series of images after the camera captured the first image in the series of images.

Embodiment 3 is the computer-implemented method of embodiment 1, wherein comparing the modified version of the first image to the second image includes identifying a pixel difference between the modified version of the first image and the second image.

Embodiment 4 is the computer-implemented method of embodiment 1, wherein comparing the modified version of the first image to the second image includes: calculating, by the computing system, a spatial gradient of the first image or the second image to identify a portion of the first image or the second image at which an edge of an object is present; identifying, by the computing system, a pixel difference between the modified version of the first image and the second image; and determining, by the computing system, a portion of the first image or the second image at which a moving edge of the object is present, as a result of (i) the calculated spatial gradient indicating that the edge of the object is present in the portion of the first image or the second image, and (ii) there being an identified pixel difference between the modified version of the first image and the second image at the portion of the first image.

Embodiment 5 is the computer-implemented method of embodiment 1. The method further includes identifying, by the computing system, a grid of multiple regions of the first image or the second image at which to analyze for movement, wherein the grid of multiple regions includes a plurality of rows, with each row including a plurality of the multiple regions; and determining, by the computing system and for more than one of the multiple regions, a value that identifies computed motion of the respective region. Determining the portion of the first image or the second image at which the position in the object in the scene moved comprises determining a value that identifies computed motion for a particular region of the multiple regions.

Embodiment 6 is the computer-implemented method of embodiment 5, wherein all of the regions in the grid of multiple regions are the same size and shape.

Embodiment 7 is the computer-implemented method of embodiment 5. The method further comprises generating, by the computing system, a value that identifies a general level of movement between the first image and the second image by combining at least some of the values that identified the computed motion for respective regions.

Embodiment 8 is the computer-implemented method of embodiment 1. The method further comprises receiving, by the computing system, a sequence of images that includes at least the first image and the second image, in addition to multiple other images; determining, by the computing system, a level of movement reflected by the first image or the second image based on the comparison of the modified version of the first image to the second image; determining, by the computing system and based on the determined level of movement reflected by the first image or the second image, to: (i) maintain the first image or the second image in computer storage, at least until user input removes the first image or the second image from the computer storage, and (ii) remove at least one of the multiple other images from storage, without receipt of user input that specifies that the at least one of the multiple other images is to be removed from storage.

Embodiment 9 is the computer-implemented method of embodiment 1, wherein the mathematical transformation that indicates movement of the camera includes a homography transform matrix.

In another embodiment, a computer-implemented method is for detecting motion in images. The method includes receiving, by a computing system, a first image that was captured by a camera. The method includes receiving, by the computing system, a second image that was captured by the camera. The method includes identifying, by the computing system, a grid of multiple regions of the second image at which to analyze for movement, wherein the grid of multiple regions includes a plurality of rows, with each row including a plurality of regions. The method includes determining, by the computing system and for more than one of the multiple regions, a value that identifies computed motion of the respective region.

Particular implementations can, in certain instances, realize one or more of the following advantages. The technology described in this disclosure allows a device to determine when an object in a scene that is being captured by a camera moves, even when the camera itself is moving. As such, the device is able to distinguish movement of an object in a scene from an apparent movement of the background of the scene that is caused by the camera movement. The device may distinguish foreground from background movement by compensating for movement of the camera in all eight degrees of movement. The device may not only be able to determine the region of the image at which movement occurs, but may be able to generate a general indication of motion saliency, for example, an indication of significance of movement in the scene. Moreover, the processes described herein may not require significant processing power and may be able to fully-compensate for eight degrees-of-freedom of camera motion, and thus may be suitable for real-time computation on mobile computing devices.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes detecting motion in images. A computing system may perform a motion-detection process by comparing two images in order to identify which portions of the image show objects that were moving in real life, and to generate a value that identifies a level of significance to this movement (e.g., a person jumping through the air may be more significant than many small leaves drifting in the wind). The computing system may compensate for movement of the camera, which can help the computing system distinguish stationary objects that appear to be moving from one image to the next due to movement of the camera, from those objects that are actually moving in real life with respect to the stationary objects.

The identification of which portions of an image are moving, and a level of significance of that movement can be used by the computing system or other computing systems in various manners. One example use is to help the computing system determine which images, of a series of images that is captured by the computing system, to save and which images to delete. As an illustration, should a user hold down a shutter button to capture a series of images, many of those images may be nearly identical and it may be unhelpful to permanently store all of the nearly-identical images or even provide them for display to a user. As such, the computing system may determine which images represent a significant level of movement with respect to other images, and may store only those that images show that significant level of movement. This process is graphically illustrated and explained with respect to FIG. 1.

Figure 1:
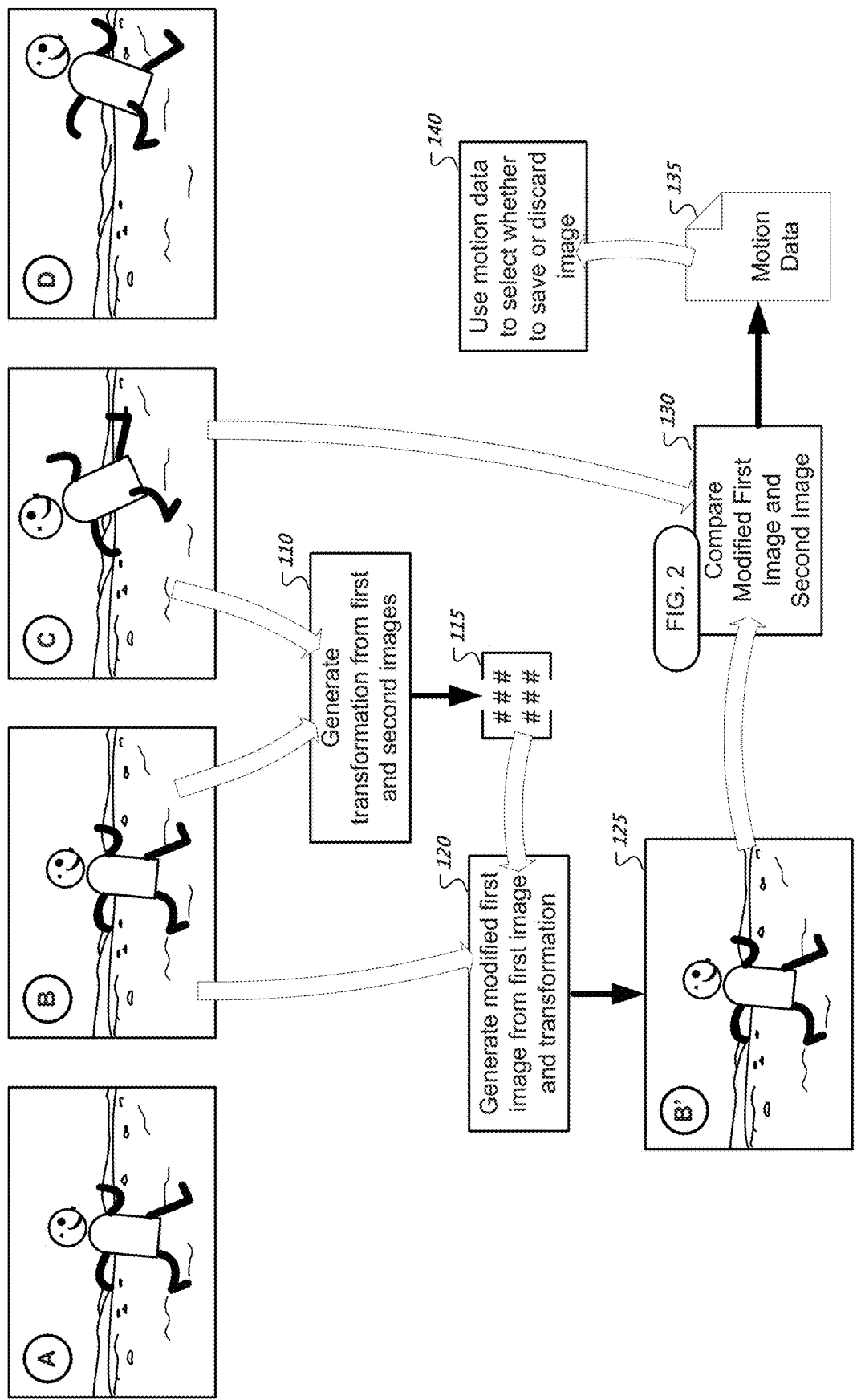
FIG. 1 shows graphical illustration of a process for detecting motion in images.

FIG. 1 shows graphical illustration of a process for detecting motion in images. In this illustration, a user of a mobile computing device (a phone in this example, but it could also be a laptop or a stand-alone camera, for example) has captured a series of images A-D of a friend crouching in place and then jumping through the air. The user may have oriented the camera lens of his phone camera to face the friend, and the user may have pressed and held down a shutter button just before the friend jumped to cause the phone to capture a series of images of the friend jumping. The series of images may include two images of the friend preparing to jump (Images A and B), one of the friend leaping into the air (Image C), and one of the friend coming back to the ground (Image D).

Although this illustration shows the phone capturing four images for ease of illustration, it is possible that the phone captured dozens of images over the same time period. It may not make sense to permanently store all of these images because the images occupy potentially-valuable computer memory, and because some of the images may be nearly identical. As such, the phone may be programmed to estimate which of the images the user may be the most interested in viewing, and may delete the remaining images without even providing the deleted images for user review or display. As an example, the phone may store the captured images in a buffer, but once the buffers fills up, the computing system may delete images that scored low in order to allow the buffer to store more-highly scoring images that are being received. The computing system may perform or at least start the scoring process with each newly-received image before the computing system captures the next image.

A first step to identify motion in the images may be to identify two images for comparison. The two images may be images that were captured adjacent to each other in time. For example, the images may be adjacent frames in a video.

Next, the computing system may compensate for movement of the phone. Because the phone is a mobile device, the user may move the phone as the user is capturing the series of pictures (e.g., by translating the phone or twisting the phone). Due to the movement of the phone, it can be difficult to compare the two images directly to each other, because the position of items that were stationary in the scene that was captured by the images may appear in different positions of the images due to the camera movement.

The computing system may compensate for movement of the camera by generating, using the first image and the second image, a mathematical transformation that indicates movement of the camera from the first image to the second image with respect to a scene that is reflected in the first image and the second image (box 110). The mathematical transformation (item 115) may be a mathematical number, series of numbers, matrix, or algorithm that indicates or can be used to indicate movement of a camera with respect to a scene from one image to the next. That transformation may be generated by identifying the locations of the same features in each of the images, and identifying how the features have moved from one image to the next. As described below, the mathematical transformation 115 can be used to modify pixels of one of the images to estimate the capture of the same scene at the same time from a different location (e.g., a location at which the other of the two images was captured).

The computing system may then generate, using the first image and the mathematical transformation, a modified version of the first image. The modified version of the first image may present the scene that was captured by the first image from a position of the camera when the second image was captured (box 120). In other words, the computing system may take the first image and run it through a mathematical process that also uses the mathematical transformation 115 as an input. The effect of the mathematical process may be to move at least some of the pixels in the first image to new positions, in a manner that is specified by or indicated by the mathematical transformation. This rearrangement may generate a new image that is a "warped" version of the original image, and that appears to show the original image from a different camera perspective. The modified first image is illustrated in FIG. 1 as Image B' (item 125). A position (e.g., location and/or orientation) of the camera when the first image was captured may be different from a position of the camera when the second image was captured.

The computing system may then compare the modified version of the first image to the second image (box 130). A computational output of this comparison may include an indication of a portion of the second image at which an object moved (e.g., with respect to a stationary background). The one or more outputs of these comparison processes are illustrated in FIG. 1 as motion data 135. The comparison processes are described in additional detail with respect to FIG. 2. Generally though, the comparison processes identify which portions of the images changed (after having compensated for camera movement). The comparison processes may additionally identify which portions of the images represent edges of objects, and the computations may emphasize changes at positions of edges over changes to features with less-prominent edges.

In some implementations, the phone uses the motion data to select whether to save an image or discard the image (box 140). For example, as described above, the device may capture more images than is necessary to store or show to a user. Thus, the device may remove some of the captured images from memory before the user is given a chance to view the images (e.g., the images are removed without user input). Alternatively, the device may de-emphasize images that score lowly (e.g., by requiring additional user input to view the images or labelling the images differently). The computing system may perform these removal or de-emphasis operations as a result of the computing system having either a fixed number of images that it is configured to store for any given captured sequence of images (e.g., a fixed buffer size) or whenever an image has a image score that falls below a given threshold (e.g., delete uninteresting images, even if the buffer may not be full).

An example input for determining which images are interesting or are not interesting (e.g., an input that is used to calculate the above-describe image score), is an input that specifies the saliency or importance to the motion in the image, which may be determined based on the above description. This motion-identifying input may be used with other inputs (e.g., a score that specifies whether people in the image have their eyes open, and a score that specifies whether the image is not blurry) to generate an overall score for the image. That overall score may be used to determine whether or not to remove the image or keep the image for later presentation to a user. Of course, the motion-detection techniques described herein may be used to achieve other results, for example, to track a location of an object.

Figure 2:
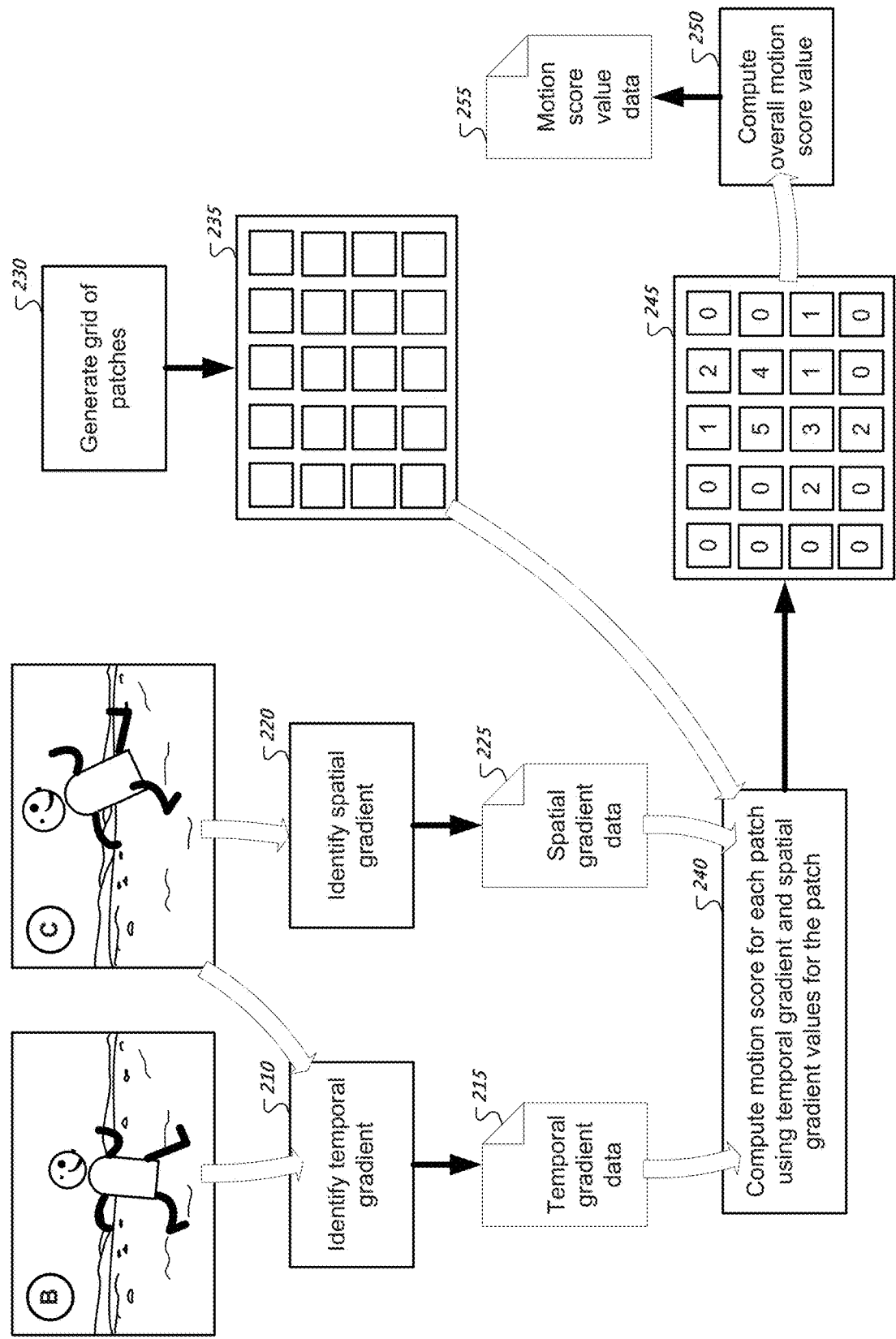
FIG. 2 shows a graphical illustration of a process for comparing two images.

FIG. 2 shows a graphical illustration of a process for comparing two images. The processes shown in FIG. 2 may represent additional detail regarding the comparison operation that is previously described at box 130 (FIG. 1).

The comparison may include the device initially computing some statistical information about the modified first image and about the second image. For example, the device may compare the images to identify a temporal gradient 215 (box 210). The temporal gradient data 215 may represent the pixel difference between the images. Because the modified first image represents the image taken from the position of the camera when it captured the second image, portions of the images that represent stationary features may have similar pixel values. As such, the pixel difference at such image locations may be zero or near zero. On the other hand, at locations in the images at which an object moved there may be a notable pixel difference (e.g., either a location at which an object was but is no more, or at a location at which an object was not but is now). The temporal gradient may represent the temporal or time difference from one image to the next, and may be calculated for multiple pixels (e.g., each pixel in the image).

The device may also calculate and identify the spatial gradient from the second image (box 220). The calculation may generate spatial gradient data 225, which may indicate how the image differs from one pixel to the next in a certain direction in the image. For example, a horizontal gradient may identify, for any given pixel in the image, how the grayscale value for the pixel to the left of the given pixel differs from the grayscale value for the pixel to the right of the given pixel. As another example, a vertical gradient may identify, for any given pixel, how the grayscale value for the pixel to the top differs from the grayscale value for the pixel to the bottom. Significant spatial gradient values may indicate the presence of edges in the image.

The computing device may use these statistical values to identify locations of the image at which motion occurs. This analysis may be performed on patches of the image. As such, the computing system may generate a grid of patches (box 230). Generating the grid of patches may include generating a grid of evenly-spaced points on an area representative of one of the images, and generating a patch (e.g., a 10-pixel by 10-pixel square) that is centered on each of the evenly-spaced points. The patches in the grid of patches 235 may or may not overlap, or may abut each other (they are shown in FIG. 2 with space between each patch, such that they do not overlap or abut each other).

The device may then calculate a motion score for each patch, using the temporal gradient data 215 and the spatial gradient data 225 (box 240). The computation of the motion score for each patch is described in additional detail with regard to FIGS. 3A-B, but this calculation may generate a score map 245. The score map 245 may include one value for each patch that indicates the saliency of the motion in that patch. It is this score map 245 (or a reduced version thereof) that may be used by the device to indicate at which regions of the image motion is occurring. In FIG. 2, the highest values in score map 245 are shown at the region of Images B' and C at which the friend moved. The values in score map 245 are illustrated as ranging from 0-5, but the values may occupy other ranges, such as a range from 0 and 1.

The device may then compute an overall motion score value (box 250). In particular, the device may use the values in score map 245 to generate overall motion score value data 255. In various examples, computing the overall motion score value data 255 may include averaging the values in the score map 245. In some examples, the overall motion score value data 255 is calculated using a nonlinear mapping function, which normalizes values to a standard range (e.g., between 0 and 1), as described in additional detail with respect to FIGS. 3A-B.

Figure 3A:
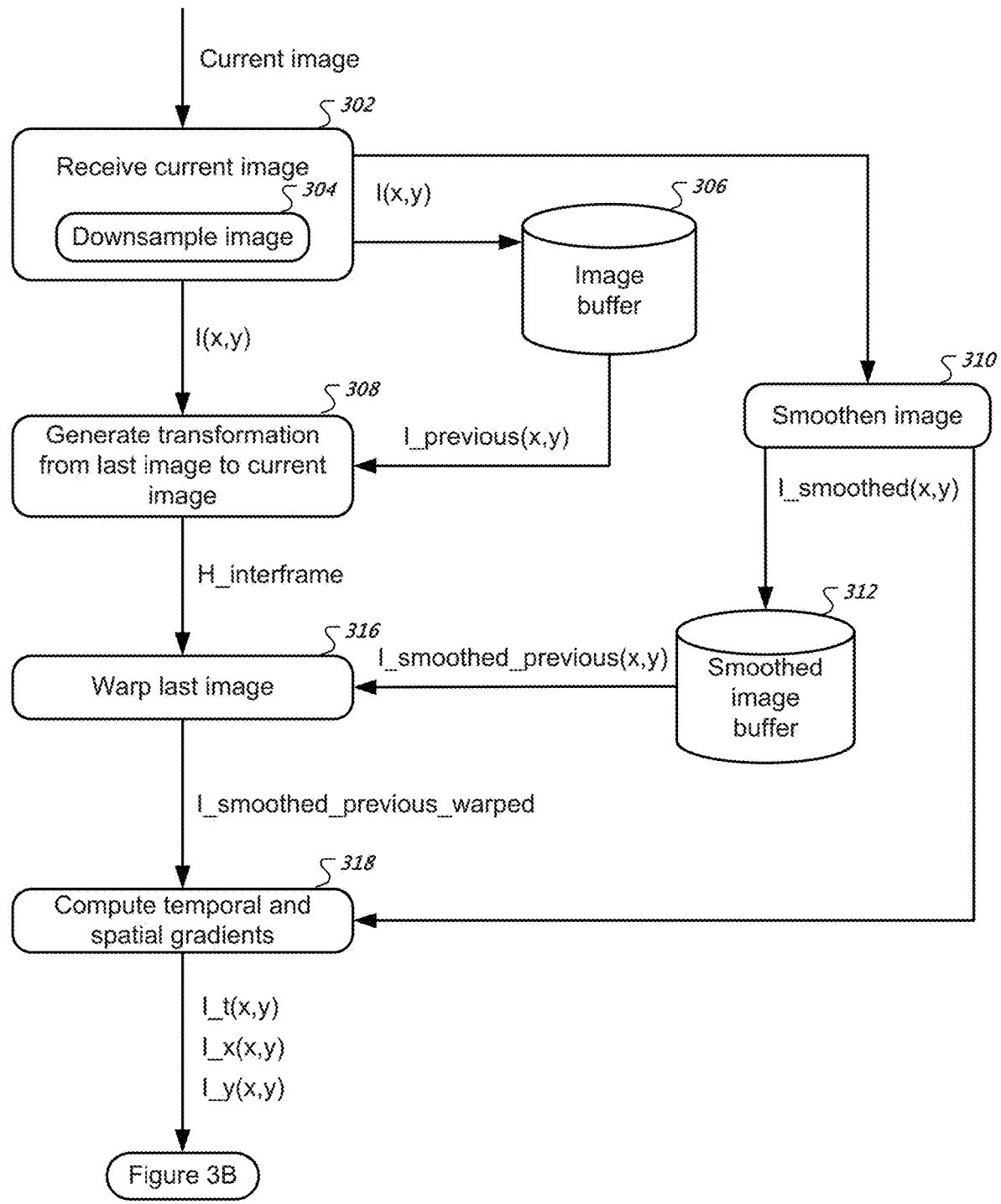
FIGS. 3A-B show a flowchart illustration of a process for detecting motion in images.
Figure 3B:
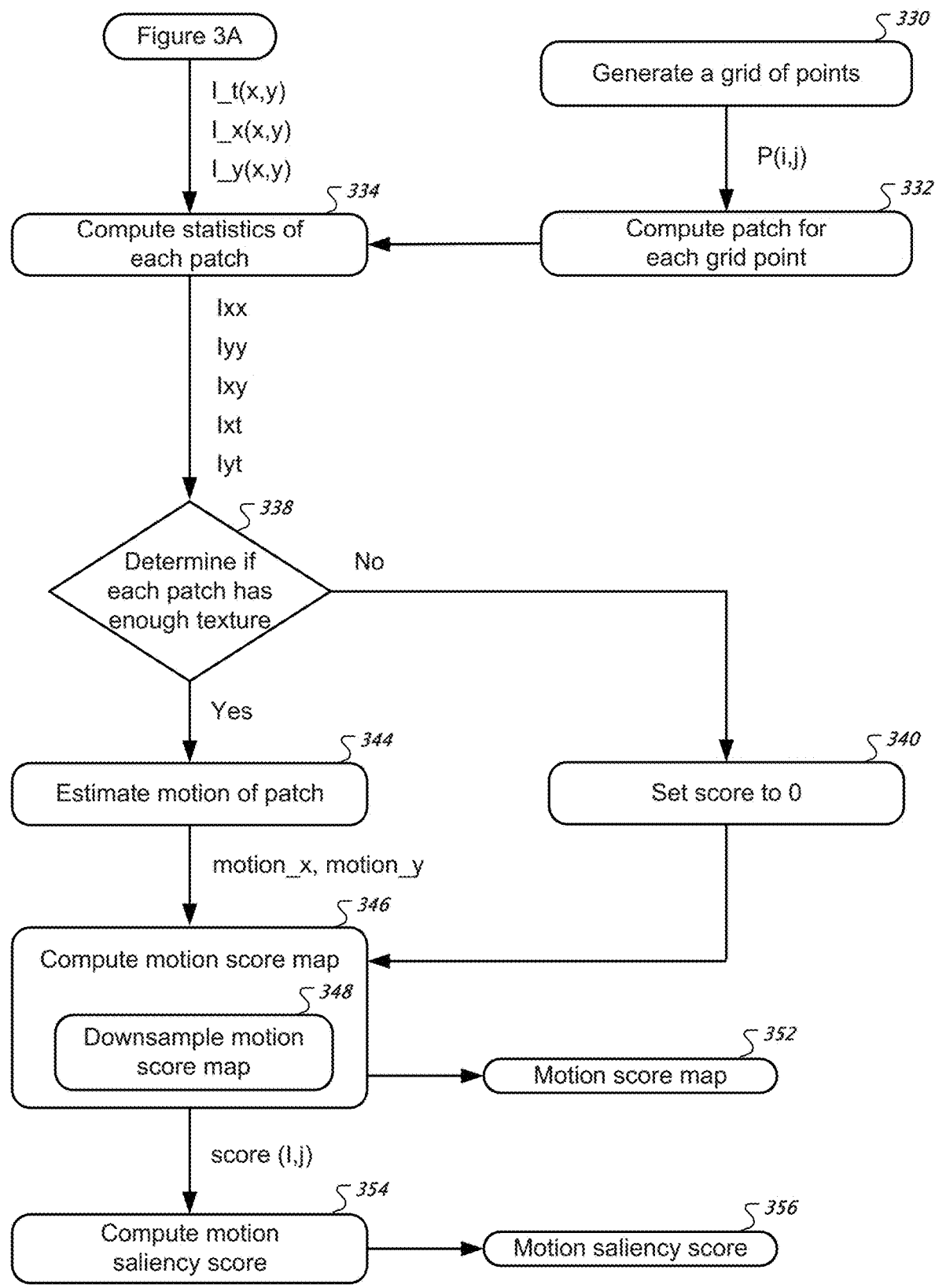

FIGS. 3A-B show a flowchart illustration of a process for detecting motion in images. The process described with respect to FIGS. 3A-B provide additional description regarding at least some aspects of the process described with respect to FIGS. 1 and 2.

At box 302, the computing system receives an image. The received image may be an image that was captured by a camera (e.g., an image sensor) of a computing device most recently. The computing system may downsample the image (box 304) in order to reduce a level of processing that is needed to perform the motion-detection processes that are described herein. For example, the received image may have a resolution of 1920×1080 pixels and the downsampling process may convert the received image to a smaller resolution of 320×180 pixels. In some implementations, the computing system also converts the received image (e.g., before or after downsampling, independent of any downsampling) from color to grayscale. The computing system may store the received image (and/or the downsampled and color-converted version thereof) in an image buffer 306, so that the system has access to previously-captured images. The images on which the processing is performed, whether the original image or a downsampled and color converted version thereof, is designated as I(x,y).

Determining which portions of the image represent an object that is moving can involve comparing the received image to a previously-received image. But, if the camera is moving, all or most of the received image and the previously-received image may be different due to the camera being at a different position at different points of time. Thus, it can be helpful to "warp" the previously-received image so that it is shown from the vantage point of the received image. Doing so can involve analyzing both images to identify how the camera moved and generating a transformation that indicates or otherwise identifies the motion of the camera, as described in additional detail below.

At box 308, the computing system estimates camera motion and generates a transformation that indicates the motion of the camera. The generated transformation may be a matrix that is created using at least two images as input (e.g., I and I_previous, from the image buffer). The transformation may be designated "H_interframe." This frame-to-frame motion matrix may be a homography transform matrix. A homography transform matrix may be a matrix that can represent movement of a scene or movement of a camera that was capturing the scene, from one image to the next (e.g., from I_previous to I).

As an illustration, suppose that a first image represents a picture taken of a square from directly in front of the square, so that the square had equal-length sides with ninety-degree angles in the image (in other words it appeared square). Suppose now that the camera was moved to the side (or the square itself was moved) so that a next image displayed the square as skewed, with some sides longer than each other and with angles that are not ninety degrees. The location of the four corner points of the square in the first image can be mapped to the location of the four corner points in the second image to identify how the camera or scene moved from one image to the next.

The identified mapping of these corner points to each other in the images can be used to generate a homography transform matrix that represents the motion of the camera viewpoint with respect to the scene that it is capturing. Given such a homography transform matrix, a system can combine the first image with the generated homography transform matrix to recreate the second frame, for example, by moving pixels in the first frame to different locations according to known homography transformation methods.

The homography transform matrix that is described above can represent not only translational movement of a camera, but also rotation, zooming, and non-rigid rolling shutter distortion. In this way, the homography transform matrix can represent movement of the camera in eight degrees-of-freedom. To compare, some image comparison techniques only account for translational movement (e.g., up/down and left/right movement).

The above-described homography transform matrix may be a 3×3 homography transform matrix, although other types of homography matrices may be used (and other mathematical representations of movement from one image to another, even if not a homography matrix or even if not a matrix, may be used). The system may determine the 3×3 matrix (H_interframe) in the following manner. First, the computing system may identify a set of feature points (sometimes corner points) in a current image, where those points may be denoted $[x'\_i, y'\_i]$, i=1 ... N (N is the number of feature points). Then, the computing system may identify corresponding feature points in the previous frame, where the corresponding feature points may be denoted $[x\_i, y\_i]$. Note that the points are described as being in the GL coordinate system (i.e., the x and y ranges from −1 to 1, with the frame center as the origin). If the points are in the image pixel coordinate system in which x ranges from 0 to the image width and y ranges from 0 to the image height, then the points can be transformed to the GL coordinate system or the resulting matrix can be transformed to compensate.

The above-described H_interfame matrix may be a 3×3 matrix which contains 9 elements:

| H_interframe = | h1, h2, h3 |
|---|---|
| | h4, h5, h6 |
| | h7, h8, h9 |

H_interfame transforms $[x\_i, y\_i]$ into $[x'\_i, y'\_i]$, as described below:
  $z\_i'*[x'\_i, y'\_i, 1]'=$H_interframe$*[x\_i, y\_i, 1]'$.
  $[x'\_i, y'\_i, 1]'$ is a 3×1 vector which is the transpose of $[x'\_i, y'\_i, 1]$ vector.

[x_i, y_i, 1]' is a 3×1 vector which is the transpose of [x_i, y_i, 1] vector.

z_i' is a scale factor.

Given a set of corresponding feature points, an example algorithm for estimating the matrix is described in the following computer vision book at algorithm 4.1 (page 91) and at algorithm 4.6 (page 123): "Hartley, R., Zisserman, A.: Multiple View Geometry in Computer Vision. Cambridge University Press (2000)," available at ftp://vista.eng.tau.ac.il/dropbox/aviad/Hartley, %20Zisserman %20-%20Multiple %20View %20Geometry %20in %20Computer %20Vision. pdf At box 310, the computing system smooths the current image. For example, the computing system may smooth the input image with a Gaussian filter to generate a smoothed input image (I_smoothed). Smoothing the input image can increase the robustness of the process, since downsampling and transforming the image can create aliasing artifacts or other noise, which the smoothing can remove or reduce. The computing system may store the smoothed image in a smoothed image buffer 312, that stores smoothed images from previous iterations of this process on previous-received images. In this disclosure, description of operations that are performed on an image includes operations that are performed on either the image or a smoothed version of the image.

At box 316, the computing system uses the transformation matrix to warp the previously-smoothed image into a new image (e.g., by warping I_smoothed_previous into I_smoothed_previous_warped). Doing so effectively shifts the location of the camera from when the previous image was taken so that it matches the location of the camera from when the current image was taken. As such, after the warping, the background, static portions of I_smoothed_previous_warped and I_smoothed may roughly match each other. This allows the computing system to compare the images to identify which portions of the image are non-background portions that are moving. The computing system can determine the coordinates for I_smoothed_previous_warped from the coordinates of I_smoothed_previous using H_interframe, as follows:

$$z'*[x', y', 1]' = H\_interframe*[x, y, 1]'.$$

[x, y, 1]' is a 3×1 vector representing the coordinate in I_smoothed_previous.

[x', y', 1]' is a 3×1 vector representing the coordinate in I_smoothed_previous_warped.

z' is a scale factor.

For each pixel [x, y] in I_smoothed_previous, the computing system is able to determine the position [x', y'] in I_smoothed_previous_warped using the above transformation, and the computing system can copy the pixel value from [x, y] in I_smoothed_previous to [x', y'] in I_smoothed_previous_warped.

At box 318, the computing system calculates the temporal gradient (e.g., the difference between pixels) between the current image and the warped version of the previous image. It may do this for each pixel as follows:

$$I\_t(x,y) = I\_smoothed(x,y) - I\_smoothed\_prevous\_warped(x,y)$$

The temporal gradient values may be further from zero the more change occurred at the location from one image to the next. As such, higher numbers (at least once the absolute value is taken) may identify portions of the image at which movement occurred.

At box 318, the computing system additionally or alternatively calculates a rate of variation in one or more directions across the image (e.g., the spatial gradient). It may do so in the x direction as follows:

$$I\_x(x,y) = (I\_smoothed(x+1,y) - I\_smoothed(x-1,y))/2.$$

It may do so in the y direction as follows:

$$I\_y(x,y) = (I\_smoothed(x,y+1) - I\_smoothed(x,y-1))/2.$$

The rate of variation is greater if the pixel lies along an edge or border (e.g., because the pixel intensity may change more between the pixel on the left and the pixel on the right when the pixel lies along an edge or border, than if the pixel was located in a portion of the image without much variation. As such, higher numbers may identify edges.

At box 330, the computing system computes a grid of points, from which a grid of patches may be generated. The computing system may calculate the grid p(i,j), with i=1→gridWidth and j=1→gridHeight. The calculation of the grid may exclude a margin at the edges of the image, for example, three percent of the image at the edges. The grid points may be evenly spaced, for example, 4 pixels apart along the x direction, and 4 pixels apart along the y direction. As an illustration, if the frame size is 320×180, the computing system may exclude 10 pixels on the left and right (320*3%=10 pixels) and 6 pixels on the top and bottom (240*3%=6 pixels). This provides a grid with a gridWidth=75 and a gridHeight=42.

For each point p(i,j) in the grid, the computing system may identify a patch from I_smoothed that is based off a location of the point (e.g., the patch may be centered on the point) (box 332). As an illustration, the patch may have a patch Width of 7 and a patchHeight of 7. The patches can overlap, be separated from each other, or be adjacent to and abut each other (e.g., like a checkerboard).

At box 334, the computing system computes one or more statistics for each patch. These statistics may use the previously-calculated temporal and spatial gradients.

A first statistic that the computing system may calculate is an average of the horizontal rates of variation in the patch, for example, as follows:

Ixx is the average of I_x(x,y)*I_x(x,y) for all pixels within the patch.

This calculation may multiply the horizontal spatial gradient values to emphasize the presence of vertical edges over smooth changes.

A second statistic that the computing system may calculate is an average of the vertical rates of variation in the patch, for example, as follows:

Iyy is the average of I_y(x,y)*I_y(x,y) for all pixels within the patch.

This calculation may multiply the vertical spatial gradient values to emphasize the presence of horizontal edges over smooth changes.

A third statistic that the computing system may calculate is an average rate of the diagonal variations in the patch, for example, as follows:

Ixy is the average of I_x(x,y)*I_y(x,y) for all pixels within the patch.

A fourth statistic that the computing system may calculate is a value that identifies vertical edges that are moving in the image, by combining the horizontal spatial gradient at a given position with the temporal gradient at that position, to generate a value that identifies if a vertical edge moved at that point, for example, as follows:

Ixt is the average of I_x(x,y)*I_t(x,y) for all pixels within the patch.

A fifth statistic that the computing system may calculate is a value that identifies horizontal edges that are moving in the image, by combining the vertical spatial gradient at a given position with the temporal gradient at that position to generate a value that identifies if a horizontal edge moved at that point, for example, as follows:

Iyt is the average of I_y(x,y)*I_t(x,y) for all pixels within the patch.

The computation of the statistics can be optimized by using integral images.

At box 338, the computing system selects those patches that have texture (e.g., by ignoring those patches that may not have texture, and may just be a portion of the image that represents a blank wall). In other words, the computing system may determine if each patch has enough texture, and for those that do not, may set a motion score of "0" to the patch (box 340). The process for selecting patches with texture can include identifying a Hessian 2×2 matrix of the patch:

{Ixx Ixy
 Ixy Iyy}

The computing system can determine the determinant of the matrix (det). The larger eigenvalue may be denoted max_eigenvalue and the smaller eigenvalue may be denoted min_eigenvalue. The computing system may select a patch as having texture if it satisfies the following conditions:

(Condition 1) det>0.

The determinant may be greater than zero when the edges in the image have at least modest x and y components to them (e.g., the edges are not purely horizontal or purely vertical, in which case it may be difficult to identify motion in a horizontal or vertical direction, respectively).

(Condition 2) min_eigenvalue>EigenvalueThreshold*frameWidth*frameHeight.

This condition may guarantee that there are at least some edges in any given direction. EigenvalueThreshold is manually tuned and an example value may be 0.0025.

(Condition 3) max_eigenvalue<EigenvalueRatioThreshold*min_eigenvalue.

This condition may guarantee that edges in a dominant direction may not overwhelm edges in another direction. EigenvalueRatioThreshold is also manually tuned and an example value may be 5. If a patch failed the above condition check, the computing system can set the motion vector for that patch to be motion_x=motion_y=0.

At box 344, for each patch that is identified as having enough texture, the computing system estimates a motion of the patch (e.g., an object depicted by the pixels in the patch) by calculating a motion vector for the patch, for example, as follows:

motion_x=(-Ixt*Iyy+Iyt*Ixy)/det.

motion_y=(Ixt*Ixy-Iyt*Ixx)/det.

In some examples, the computing system applies the Lucas-Kande differential method for optical flow estimation.

At box 346, the computing system computes a motion score for each patch. The motion scores can be combined to generate a motion score map 352. A map of motion scores may be calculated as follows:

score(i,j)=1-exp(-(motion_x(i,j)*motion_x(i,j)+motion_y(i,j)*motion_y(i,j))/motionParam).

In this equation, motionParam may be manually set by a user, and may have a value of 10. In some examples, the computing system may downsample the collection of scores (e.g., one score for each patch, with some having a 0 value) to a smaller motion score map: score_small(k,l), k=1→scoreWidth, l=1→scoreHeight (box 348). An example interpolation method to downsample the score map is to average a window of multiple points to get one value. For example, to downsample by 3, average every 3×3 window to get one pixel. As such, the computing system may end up with a 10×10 grid of scores rather than a 50×50 grid of scores. Description in this disclosure relating to a motion score map can refer to a motion score map or a downsampled version thereof.

At box 354, the computing system calculates the entropy value of the score map, as follows:

total_score=sum(score_small(k,l)+Epsilon) for all k and l.

p(k,l)=(score_small(k,l)+Epsilon)/total_score).

entropy=-sum(Log(p(k,l)*P(k,l)).

Epsilon may be a small number to avoid problems caused by 0. The entropy value may identify the disorder in the image, which can illustrate a difference in movement throughout the image. For example, if all or most of the image is moving (e.g., because a camera focused on the side of a large truck that is pulling away), then there is not much disorder because all or most of the image is moving. On the other hand, there is a great deal of disorder and a high entropy if there are multiple people running around in an image, because many portions of the image are moving and many portions are not moving. Entropy may be large if motion is highly concentrated in a few portions of the image.

The computing system may use the generated entropy value to generate a motion saliency score. This score may identify an importance to the motion in the image. The motion_saliency_score may be a value between 0 and 1 that can be generated using the following nonlinear mapping function:

motion_saliency_score=1-exp(entropy*saliencyParam1)*saliencyParam2.

saliencyParam1 may be manually tuned.

saliencyParam2 may be manually tuned.

The computing system outputs the motion saliency score 356 to inform another process or device how salient the motion is in the image. The computing system may also output the motion score map to inform another process or device where motion is occurring within a frame.

In the above description, a previously-received image is warped to match the camera position of a later-received image, and then various operations are performed on the later-received image, for example, calculations of the spatial gradient. Skilled artisans would understand that similar results could be achieved by applying the processes to the other of the two images. For example, the later-received image can be the image that is warped to match the position of the previously-received image, and subsequent operations such as the calculation of the spatial gradient could be performed on the previously-received image. Moreover, these operations (e.g., the spatial gradient) can be performed on the image that was warped, whether that is the previously-received image or the later-received image. As such, portions of this disclosure may refer to operations being performed on either the first image "or" the second image, to illustrate the various manners in which the motion estimation mechanisms may be performed.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 4:
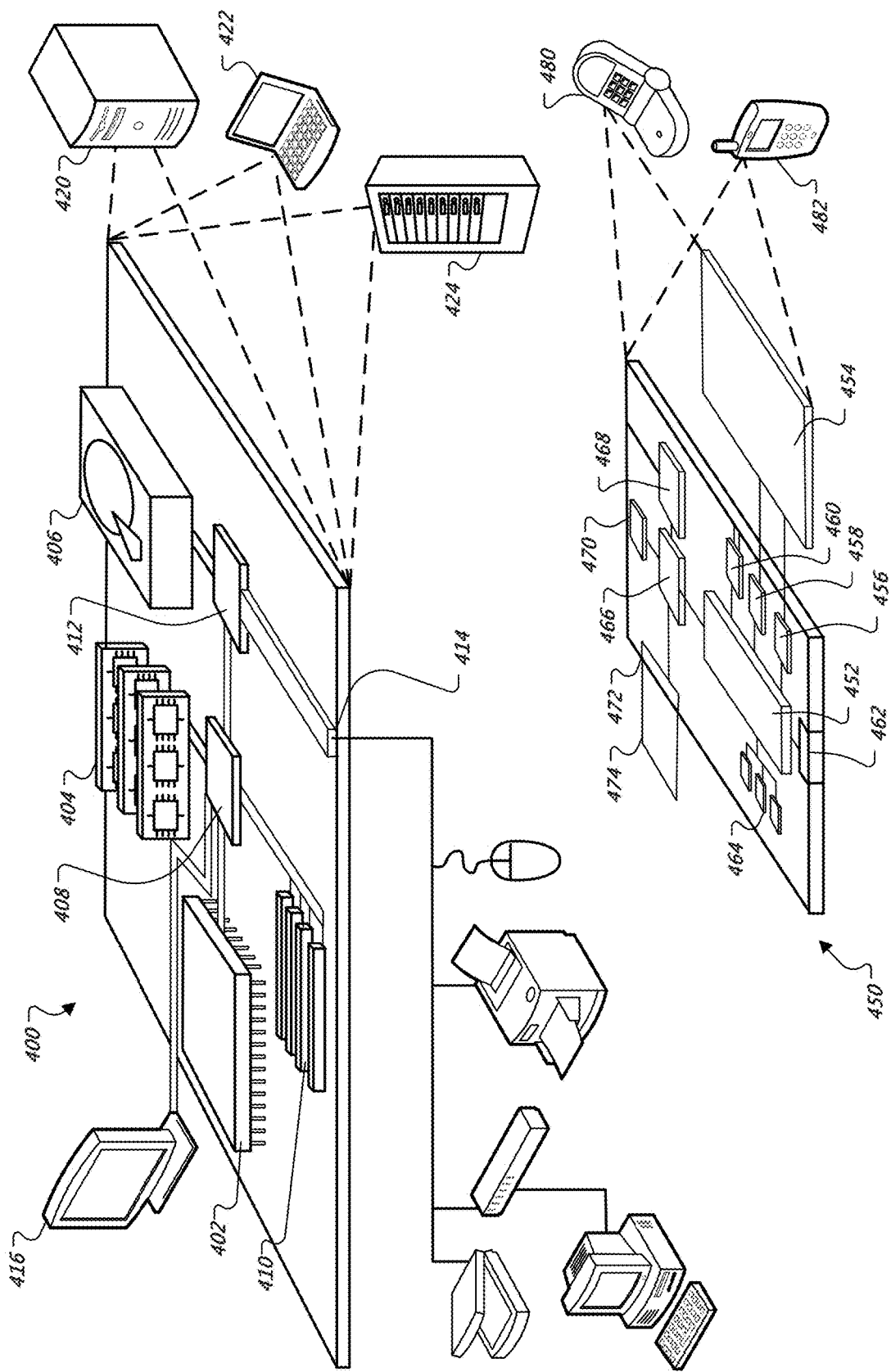
FIG. 4 is a block diagram of computing devices that may be used to implement the systems and methods described in this document, as either a client or as a server or plurality of servers.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low speed controller 412 manages lower bandwidth-intensive operations. Such allocation of functions is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provided, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
 receiving, by a computing system, a sequence of images that includes a first image and a second image, in addition to multiple other images that were captured by a camera as part of the sequence of images;
 calculating, by the computing system, a spatial gradient of the first image to identify a portion of the first image at which an edge of an object is present;
 identifying, by the computing system, a pixel difference between the first image and the second image;
 determining, by the computing system, that the edge of the object moved in a scene depicted by the first image and the second image, based on analysis of the spatial gradient of the first image and the pixel difference between the first image and the second image;
 removing, by the computing system and based on having determined that the edge of the object moved in the scene based on analysis of the spatial gradient of the first image and the pixel difference between the first image and the second image, a removed image of the multiple other images that were captured by the camera as part of the sequence of images from the computer storage, without receipt of user input that specifies that the removed image is to be removed from the computer storage.

2. The computer-implemented method of claim 1, wherein the second image is an image that the camera captured in the sequence of images immediately after the camera captured the first image in the sequence of images.

3. The computer-implemented method of claim 1, comprising maintaining, by the computing system and based on having determined that the edge of the object moved in the scene, a maintained image of the first image or the second image in computer storage, at least until user input removes the maintained image of the first image or the second image from the computer storage, due to the maintained image of the first image or the second image being determined to show more significant movement than the removed image.

4. The computer-implemented method of claim 1, wherein the computing system determines that the edge of the object moved by:
 (i) determining that the spatial gradient calculated by the computing system indicates that the edge of the object is present at the portion of the first image; and
 (ii) there being an identified pixel difference between the portion of the first image and a corresponding portion of the second image.

5. The computer-implemented method of claim 1, wherein the computing system removes the removed image from the computing storage based on a general level of movement indicated by the first image or the second image, based:
 (i) in part on determining that the edge of the object moved at the portion of the first image or the corresponding portion of the second image; and
 (ii) in part on identifying movement elsewhere in the first image or the second image.

6. The computer-implemented method of claim 1, wherein the computing system captures the sequence of images in response to user input holding down a shutter button for the camera.

7. The computer-implemented method of claim 1, wherein a position of the camera when the first image was captured is different from a position of the camera when the second image was captured.

8. The computer-implemented method of claim 1, wherein the computing system removes the removed image from the computing storage based on both:
 (i) having determined that the edge of the object moved in the scene depicted by the first image and the second image; and
 (ii) scores that specify blurriness of respective images in the sequence of images including at least the first image or the second image.

9. One or more non-transitory computer-readable devices including instructions that, when executed by one or more processors, cause performance of operations that include:
 receiving, by a computing system, a sequence of images that includes a first image and a second image, in addition to multiple other images that were captured by a camera as part of the sequence of images;
 calculating, by the computing system, a spatial gradient of the first image to identify a portion of the first image at which an edge of an object is present;
 identifying, by the computing system, a pixel difference between the first image and the second image;
 determining, by the computing system, that the edge of the object moved in a scene depicted by the first image and the second image, based on analysis of the spatial gradient of the first image and the pixel difference between the first image and the second image;
 removing, by the computing system and based on having determined that the edge of the object moved in the scene based on analysis of the spatial gradient of the first image and the pixel difference between the first image and the second image, a removed image of the multiple other images that were captured by the camera as part of the sequence of images from the computer storage, without receipt of user input that specifies that the removed image is to be removed from the computer storage.

10. The one or more non-transitory computer-readable devices of claim 9, wherein the second image is an image that the camera captured in the sequence of images immediately after the camera captured the first image in the sequence of images.

11. The one or more non-transitory computer-readable devices of claim 9, wherein the operations include maintaining, by the computing system and based on having determined that the edge of the object moved in the scene, a maintained image of the first image or the second image in computer storage, at least until user input removes the maintained image of the first image or the second image from the computer storage, due to the maintained image of the first image or the second image being determined to show more significant movement than the removed image.

12. The one or more non-transitory computer-readable devices of claim 9, wherein the computing system determines that the edge of the object moved by:
 (i) determining that the spatial gradient calculated by the computing system indicates that the edge of the object is present at the portion of the first image; and (ii) there being an identified pixel difference between the portion of the first image and a corresponding portion of the second image.

13. The one or more non-transitory computer-readable devices of claim 9, wherein the computing system removes the removed image from the computing storage based on a general level of movement indicated by the first image or the second image, based:
(i) in part on determining that the edge of the object moved at the portion of the first image or the corresponding portion of the second image; and
(ii) in part on identifying movement elsewhere in the first image or the second image.

14. The one or more non-transitory computer-readable devices of claim 9, wherein the computing system captures the sequence of images in response to user input holding down a shutter button for the camera.

15. The one or more non-transitory computer-readable devices of claim 9, wherein a position of the camera when the first image was captured is different from a position of the camera when the second image was captured.

16. The one or more non-transitory computer-readable devices of claim 9, wherein the computing system removes the removed image from the computing storage based on both:
(i) having determined that the edge of the object moved in the scene depicted by the first image and the second image; and
(ii) scores that specify blurriness of respective images in the sequence of images, including at least the first image or the second image.

* * * * *